(12) United States Patent
Muren et al.

(10) Patent No.: US 10,377,478 B2
(45) Date of Patent: Aug. 13, 2019

(54) THRUST-GENERATING ROTOR ASSEMBLY

(71) Applicant: FLIR Unmanned Aerial Systems AS, Hvalstad (NO)

(72) Inventors: Petter Muren, Nesbru (NO); Trygve Frederik Marton, Slependen (NO); Ivar Johnsrud, Hønefoss (NO); Pӓl Hagh Sandberg, Hvalstad (NO)

(73) Assignee: FLIR UNMANNED AERIAL SYSTEMS AS, Hvalstad (NO)

( * ) Notice: Subject to any disclaimer, the term of this patent is extended or adjusted under 35 U.S.C. 154(b) by 196 days.

(21) Appl. No.: 15/545,308

(22) PCT Filed: Jan. 20, 2016

(86) PCT No.: PCT/EP2016/051065
§ 371 (c)(1),
(2) Date: Jul. 20, 2017

(87) PCT Pub. No.: WO2016/116478
PCT Pub. Date: Jul. 28, 2016

(65) Prior Publication Data
US 2018/0002008 A1      Jan. 4, 2018

(30) Foreign Application Priority Data

Jan. 21, 2015   (NO) .................................. 20150105

(51) Int. Cl.
*B64C 27/51*        (2006.01)
*B64C 27/58*        (2006.01)
(Continued)

(52) U.S. Cl.
CPC ............. *B64C 27/72* (2013.01); *A63H 27/12* (2013.01); *B64C 27/51* (2013.01); *B64C 27/58* (2013.01);
(Continued)

(58) Field of Classification Search
CPC ......... B64C 27/51; B64C 27/58; B64C 27/72; B64C 2201/024; A63H 27/12; Y02T 50/34
See application file for complete search history.

(56) References Cited

U.S. PATENT DOCUMENTS 5,259,729 A  *  11/1993  Fujihira ................. A63H 27/12
                                                   416/131
7,422,505 B2 *  9/2008  Van de Rostyne .... A63H 27/12
                                                   244/17.13
(Continued)

FOREIGN PATENT DOCUMENTS

DE            36 33 346       11/1987
DE         10 2005 007129      8/2006
(Continued)

*Primary Examiner* — Igor Kershteyn
(74) *Attorney, Agent, or Firm* — Haynes and Boone, LLP

(57) ABSTRACT

The present invention discloses a rotor control system where rapid changes in rotor torque are transferred into moment forces acting about the blade pitch axis of a rotor blade in a thrust-generating rotor, to ultimately control the movements of a rotary wing aircraft. The moment forces acting on the rotor blade are transferred through a carefully adjusted damping member in order to allow rapid changes in rotor torque to create cyclic changes in blade pitch angle, while slow or permanent changes are cancelled out and affects the rotational speed and the thrust generated by the rotor, without permanently affecting the blade pitch angle of individual rotor blades.

20 Claims, 9 Drawing Sheets

(51) Int. Cl.
  *B64C 27/72*   (2006.01)
  *A63H 27/00*   (2006.01)
(52) U.S. Cl.
  CPC ......... *B64C 2201/024* (2013.01); *Y02T 50/34* (2013.01)

(56) References Cited

U.S. PATENT DOCUMENTS

| | | | | |
|---|---|---|---|---|
| 7,662,013 | B2* | 2/2010 | Van de Rostyne | A63H 27/12 244/17.11 |
| 7,883,392 | B2* | 2/2011 | Van de Rostyne | A63H 27/12 244/17.11 |
| 8,002,604 | B2* | 8/2011 | Van de Rostyne | A63H 27/12 244/17.11 |
| 8,357,023 | B2* | 1/2013 | Van de Rostyne | A63H 27/12 244/17.11 |
| 8,950,699 | B1* | 2/2015 | van der Westhuizen | B64C 27/48 244/17.11 |
| 2004/0198136 | A1 | 10/2004 | Vogel | |
| 2007/0181742 | A1* | 8/2007 | Van de Rostyne | A63H 27/02 244/17.23 |
| 2008/0299867 | A1* | 12/2008 | Van de Rostyne | A63H 27/06 446/37 |
| 2012/0241563 | A1* | 9/2012 | Chaduc | B64C 13/30 244/196 |

FOREIGN PATENT DOCUMENTS

| | | |
|---|---|---|
| EP | 0 515 998 | 12/1992 |
| WO | WO 2005/087587 | 9/2005 |

* cited by examiner

THRUST-GENERATING ROTOR ASSEMBLY

CROSS-REFERENCE TO RELATED APPLICATIONS

This patent application is a U.S. National Stage Patent Application under 35 U.S.C. 371 of International Patent Application No. PCT/EP2016/051065, filed Jan. 20, 2016 and entitled "THRUST-GENERATING ROTOR ASSEMBLY," which claims priority to and the benefit of Norway Patent Application NO20150105, filed Jan. 21, 2015 and entitled "THRUST-GENERATING ROTOR ASSEMBLY," which are all hereby incorporated by reference in their entirety.

FIELD OF THE INVENTION

The present invention relates to a thrust-generating rotor assembly for controlling moment forces about the blade pitch axis of a rotor blade, thereby controlling the blade pitch angle and ultimately the movements of a rotary wing aircraft.

BACKGROUND OF THE INVENTION

Unmanned Aerial Vehicles (UAVs) are used in a wide range of applications, both civilian and military, including inspection, intelligence, reconnaissance and rescue missions. UAV designs ranges from large fixed wing jets to smaller rotary wing aircraft with one or more rotors. Progress in the electronics industry over the past decades have made it possible to shrink the components necessary for an unmanned aerial vehicle system to become palm sized, a so-called Micro Air Vehicle (MAV). These vehicles can for example lift a camera and transmit video images, while still being highly maneuverable.

Regardless of the size, rotary wing aircraft like helicopters, are typically sustained by one or more rotors, rotating about vertical rotor shafts. In conventional helicopters, the amount of thrust from the rotor and the direction of the thrust can be controlled by changing the pitch angle of the rotor blades. The horizontal direction of flight and the stability of the helicopter are controlled by cyclically adjusting the pitch angle of the rotor blades through a so-called swash plate. Cyclically adjusting the pitch angle means that the pitch angle of each rotor blade is adjusted from a maximum in one particular position to a minimum 180 degrees later in the rotation. When the blade pitch alters like this, the initially vertical thrust tilts, and thereby generates a horizontal vector, moving the helicopter in the desired direction. By collectively changing the blade pitch of all the rotor blades, i.e. change the blade pitch of all blades with the same amount, or by changing the rotational speed of the rotor, the helicopter can be controlled in a vertical direction.

The alteration in blade pitch angle of the rotor blades is typically done by operating control rods attached to the swash plate, a unit consisting of a rotating disc and a non-rotating disc rotationally connected to each other. Typically, the inner end of each blade is connected to the rotating disc via pitch links, while the control rods are attached to the non-rotating disc. Operating the control rods incline or decline the swash plate at one or several points. As the rotor rotates, the blade pitch angle of the rotor blades are cyclically adjusted through the rotation as they move over the section inclined or declined by the swash plate control rods.

The control rods in a rotary wing aircraft are typically attached to, or constitutes of, servos that operate the movement of the control rods on input signals from the pilot, making the aircraft move in the desired direction. However, in light of advances in MAV technology, and to enable simpler and lower-cost aircraft, it is desirable to utilize a design that does not rely on the previously mentioned swash plate and servos for maneuvering an aircraft.

JP 3-2298463 (U.S. Pat. No. 5,259,729), Fujihira et al. elaborates on a method where one can cyclically control the blade pitch angle of the rotor blades in a two-bladed rotor without the use of a swash plate and servos, thereby controlling the movement of the aircraft. A sensor measures the position of the rotor blades, while a connecting member is, at the top, attached to the rotor blade assembly and at, the bottom, fixed to a circular plate that rotates with the rotor shaft. The connecting member is made of flexible material and is adjusted to fit a certain rotor torque.

The connecting member transfers the rotor torque from the rotor shaft to the rotor. Due to air resistance and the rotational inertia of the rotor, any increase or decrease in the torque applied to the rotor will not immediately change the rotational speed of the rotor, but instead bend the connecting member. This bending or deformation, in turn, generates a corresponding tilting moment that tilts the rotor blades and alters their blade pitch angle. Since the two blades in the rotor blade assembly are connected, and can tilt about a common blade pitch axis, an alternation in torque will give an asymmetrical blade pitch angle, i.e. increase in one blade and decrease in the opposite blade, ultimately creating a dissymmetry in lift. The dissymmetry in lift or thrust will tilt the rotor and move the aircraft in a horizontal direction as long as the alternating torque is repeated at the same point in the rotational plane. As the torque is returned to the nominal level, the flexible characteristic of the connecting member implies that the rotor blades level out and the movement of the aircraft ends.

A disadvantage of the design shown in JP 3-2298463 is, however, that it relies on a nominal value of Revolutions per Minute (RPM) of the rotor and a nominal torque of the rotor to avoid extensive vibrations in the rotor. If an average torque applied to the rotor, from a motor of the aircraft, is above the nominal value, the rotor blade closest to the connecting member will always have a higher blade pitch angle than the opposite blade. If the average torque applied to the rotor is below the nominal value, the rotor blade closest to the connecting member will always have a lower blade pitch angle than the opposite blade. In both cases, the sustained difference in blade pitch angle between the two rotor blades will result in unacceptable vibrations and resonance in the aircraft. One example is under the appearance of light wind or turbulence, the aircraft will then immediately start to climb or descend. To counter this, the rotor RPM required to keep the aircraft vertically stable will result in a rotor torque that, most of the time, is different from the nominal torque. This again results in large vibrations, making it unsuited for any practical applications. In challenging conditions, or if high maneuverability is required, the performance of the design described in JP 3-2298463 is poor.

Operations outside the nominal torque will also result in the connecting member reaching a mechanical limit preventing further adjustments in blade pitch angle. This again results in a significant reduced level of blade pitch control. The reduction in control will be more evident the further away from the nominal torque the rotor is operated. In other words, the design described in JP 3-2298463 is best suited for indoor toy helicopters, but the design is not possible to use in an outdoor operational helicopter that requires high maneuverability and stable flight with a minimum of vibrations that could affect its pilot, autopilot and/or cameras carried therewith.

US 2011143628 describes an unconventional rotary wing aircraft suited for toy applications. The aircraft design is very different from a conventional helicopter, but it utilizes a cyclic rotor control system that is similar to the one described in JP 3-2298463. This aircraft is also controlled by cyclic changes in the torque applied to a two-bladed rotor. In this case, the rotor is injection molded in one piece using a flexible plastic material. The rotor control described in US 2011143628 operates, however, in the same way as the rotor control described in JP 3-2298463, and has the same limitations.

US 2004198136 A1 teaches a method and a system for controlling pitch of the rotor blades of a remote control ultralight helicopter, with at least one rotor blade. According to the invention, the adjustment of the pitch of the at least one rotor blade is achieved by means of a force, in particular a torsion force directly applied to the rotation axis of the rotor blade. The force is generated by a magnetic field, variable by the electrical control of at least one coil which is not part of an electric motor.

WO 2005087587 shows several rotor blade adjustment systems influencing aerodynamic force that does not require a swash plate, but reacts to cyclic and/or non-cyclic accelerations of a rotation variable supplied to the rotor. According to the desired control movement, the driving force is modulated and the control signal is transmitted as torque to the rotor by means of the rotor shaft to alter the position of the blades and thereby the movement of the aircraft.

There are even more examples of designs that aim to control the blade pitch angle of rotary wing aircraft by altering the torque to the rotor, e.g. Penn State University WO2014160526. Common to all of the examples is, however, the dissymmetry in blade pitch angle or orientation that occur if the rotor is operated at a RPM or torque level outside of the nominal design value, or if large cyclic control forces are required. In all the known designs, this dissymmetry will limit the possible blade pitch range and it will create undesired or unacceptable vibrations.

A thrust-generating rotor assembly for both small MAVs and larger rotary wing aircraft, without the disadvantages and limitations discussed above, would enable simpler, better and lower cost systems.

SUMMARY OF THE INVENTION

An objective of the embodiments herein is to overcome or at least alleviate the above mentioned disadvantages. This object and other objects are achieved by the independent claims enclosed herein.

According to an aspect, the objective may be achieved by a thrust-generating rotor assembly comprising a rotor torque assembly, rotationally connected to a rotor blade assembly with rotor blades having a blade pitch angle and being adjusted to tilt about a rotor blade axis, and a cyclic pitch control system, wherein at least one spring member connected between the rotor torque assembly and the rotor blade assembly is adjusted to transfer changes in rotor torque into proportional changes in rotational offset between the rotor torque assembly and the rotor blade assembly without introducing tilting moments about the rotor blade axis, and where a damping member, interacting with a pitch arm, is adjusted to transfer said changes in rotational offset into substantial tilting moments about said rotor blade axis at rapid changes in rotor torque and to cancel or limit said tilting moments at slow or permanent changes in rotor torque, and where said tilting moments acts on at least one rotor blade to control said blade pitch angle.

In one embodiment, the thrust-generating rotor assembly comprises a damping member further adjusted to enable said tilting moment to predictable follow the rate of said change of rotational offset.

In one embodiment, the thrust-generating rotor assembly comprises a rotor blade assembly that further comprises dynamically stable rotor blades and/or a stabilizing flybar adjusted to create a stabilizing tilting moment about the rotor blade axis as long as there is a difference in blade pitch angle between the rotor blades in the rotor blade assembly.

In one embodiment, the thrust-generating rotor assembly comprises a rotor torque assembly that includes a rotor shaft having a rotor shaft axis, and a rotor head fixed to the rotor shaft, and where said pitch arm has an upper end and a lower end.

In one embodiment, the thrust-generating rotor assembly comprises a rotor blade assembly that further includes a connecting member adjusted to rotationally connect the rotor blade assembly to the rotor torque assembly, allowing rotational movement between the rotor torque assembly and the rotor blade assembly but little or limited planar movements.

In one embodiment, the rotor blade assembly further includes a first blade and an oppositely pointing second blade respectively being allowed to alter their blade pitch angle by means of pitch hinges mounted in the rotor blade axis, and wherein the pitch arm interacting with the damping member is connected to the first blade.

In one embodiment, the thrust-generating rotor assembly comprises a damping member that further comprise a first concentric part and a second concentric part, adapted to fit together, and a damping means between the two concentric parts, said damping means being adjusted so the two concentric parts generally follow each other's movements at rapid or cyclic changes in the speed and position of the first concentric part, and allow the movements of the concentric parts to differ with respect to each other at a slow or permanent change in the speed and position of the first concentric part.

In one embodiment, the damping member is further mounted on a rotor head, positioned and centered around a rotor shaft, and where the said concentric parts in the damping member are adjusted to rotate in a plane perpendicular to the rotor shaft axis, and wherein the pitch arm is connected to the rotor blade assembly in the upper end and to the damping member, by a hinged pitch arm connection, in the lower end.

In one embodiment, the damping member is mounted to a rotor head and positioned under an inner end of a first rotor blade, and where said first concentric part is a cylinder and said second concentric part is a piston adjusted to move inside said cylinder along its central axis perpendicular to both the rotor shaft axis and to the rotor blade axis, and wherein the pitch arm is mounted to the rotor blade assembly in the upper end and to the piston by a hinged pitch arm connection, in the lower end.

In one embodiment, the damping member is mounted on the rotor blade assembly and where the said concentric parts are adjusted to rotate in a plane generally perpendicular to the rotor blade axis, and where the second concentric part is fixed to the rotor blade assembly and the first concentric part is connected to the upper end of the pitch arm, and where the lower end of the pitch arm is connected to a rotor head by a hinged pitch arm connection.

The embodiments described above may be combined to form further embodiments in which features of each of the embodiments above are combined in any suitable manner.

DETAILED DESCRIPTION OF AN EXAMPLE EMBODIMENT OF THE PRESENT INVENTION

The present invention relates to a thrust-generating rotor assembly comprising a cyclic pitch control system for controlling tilting moments about a longitudinal rotor blade axis of one or more rotor blades in the thrust-generating rotor assembly, in order to control the pitch angle of the rotor blades and thus the horizontal movements of a helicopter vehicle or a rotary wing aircraft. "Cyclic" in this document refers to actions occurring at the same position in each rotation of the rotor, to ultimately create a dissymmetry in lift, thereby tilting the rotor and aircraft in order to control movements in a horizontal direction.

In the following, the present invention will be discussed and example embodiments described by referring to the accompanying drawings.

Figure 1A:
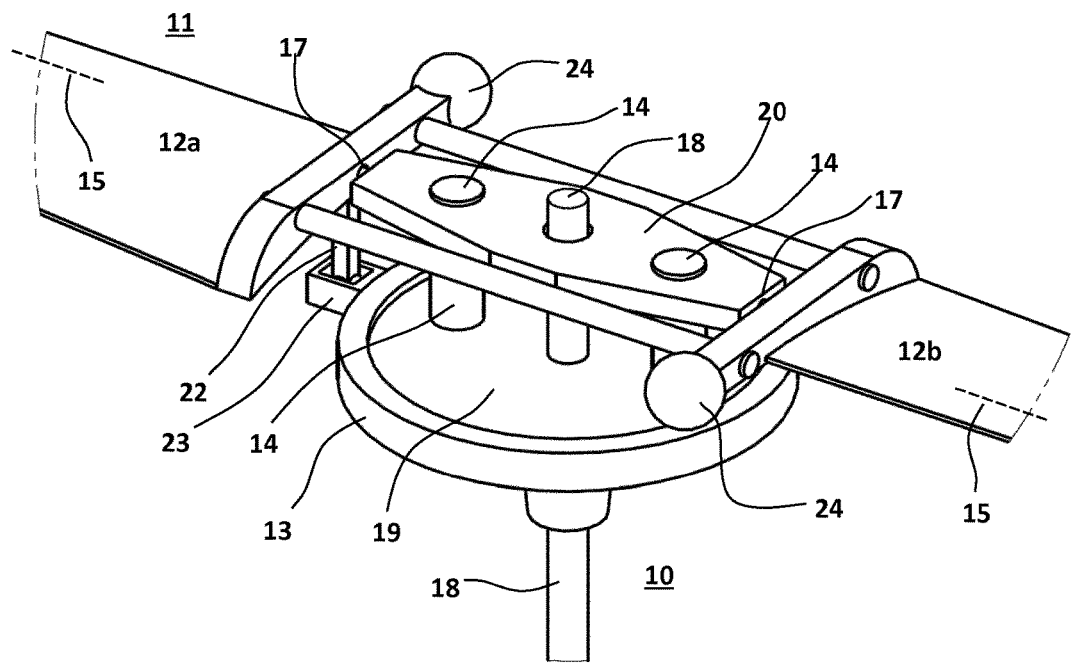
FIGS. 1a and 1b illustrates perspective views of a thrust-generating rotor assembly in a stationary position according to one embodiment of the present invention.
Figure 1B:
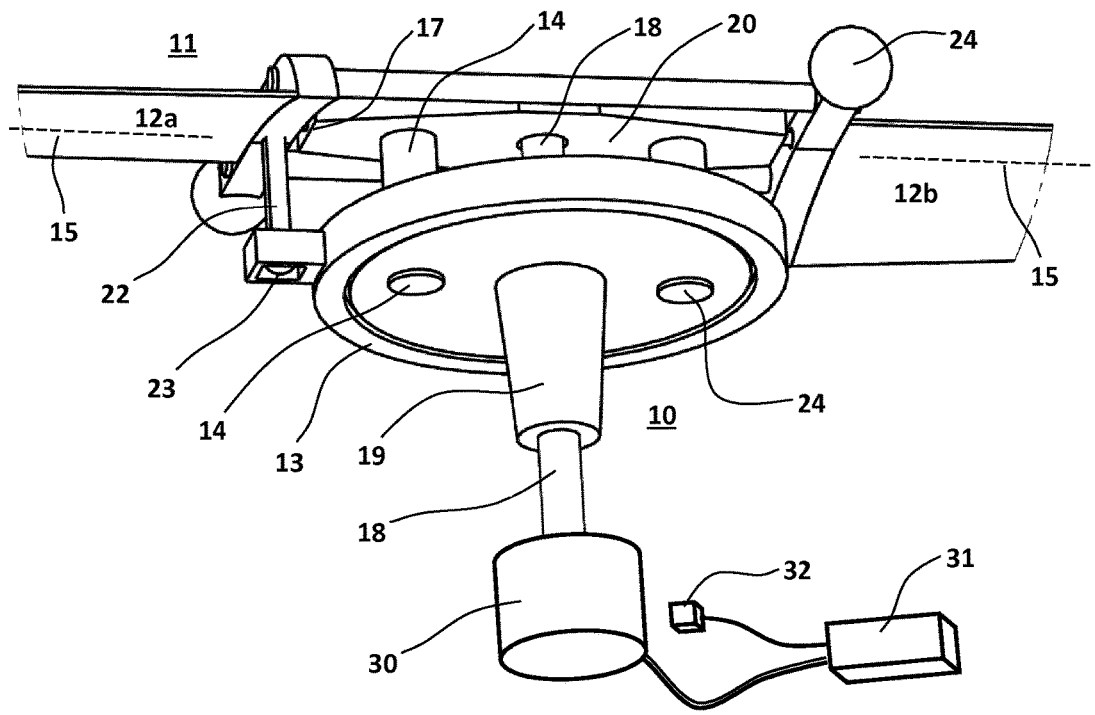
Figure 2A:
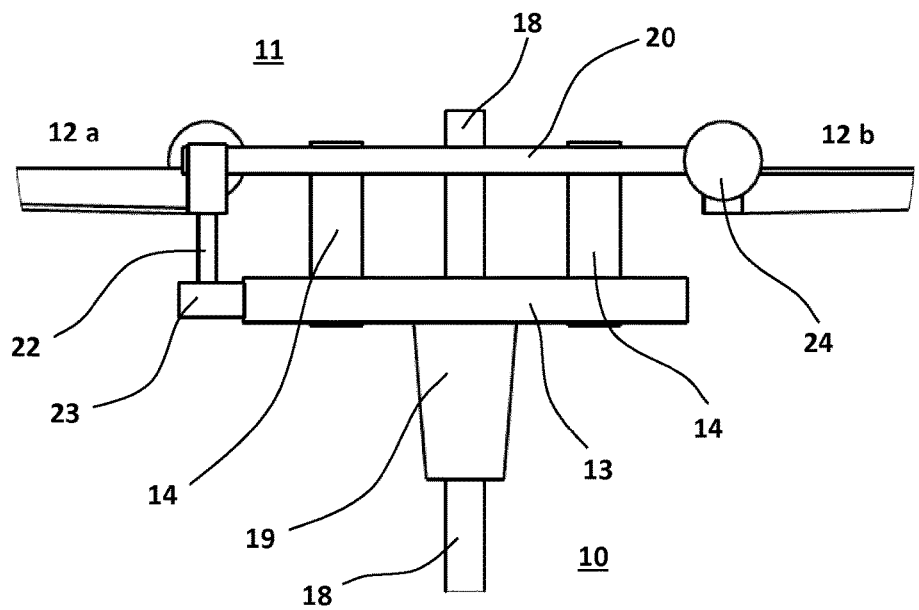
FIGS. 2a and 2b illustrate the thrust-generating rotor assembly from the front in a plane view and in a plane cut-through view.
Figure 2B:
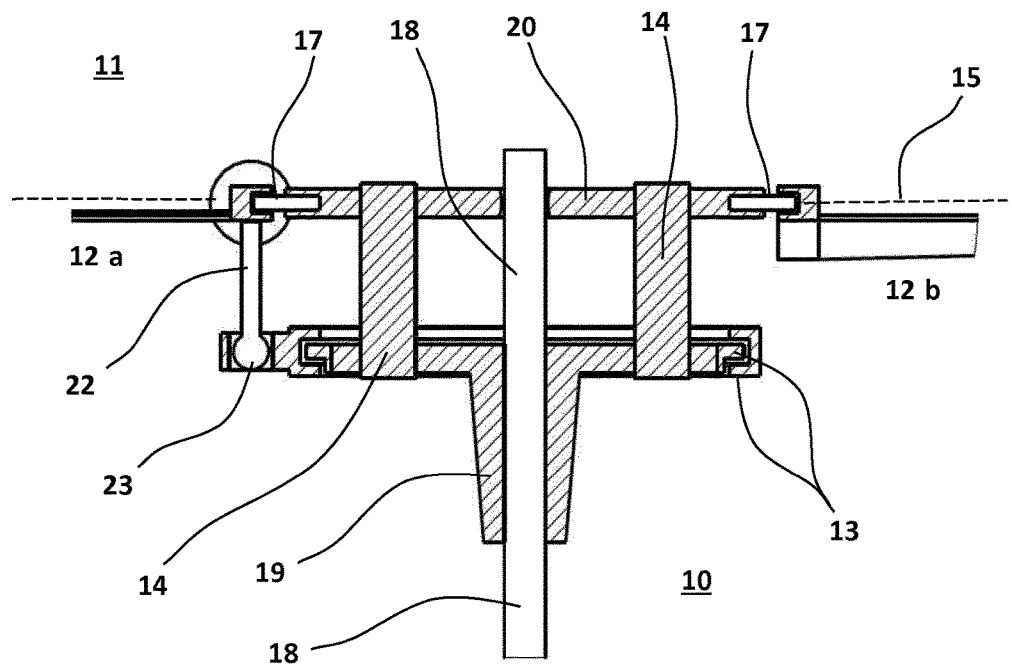
Figure 3A:
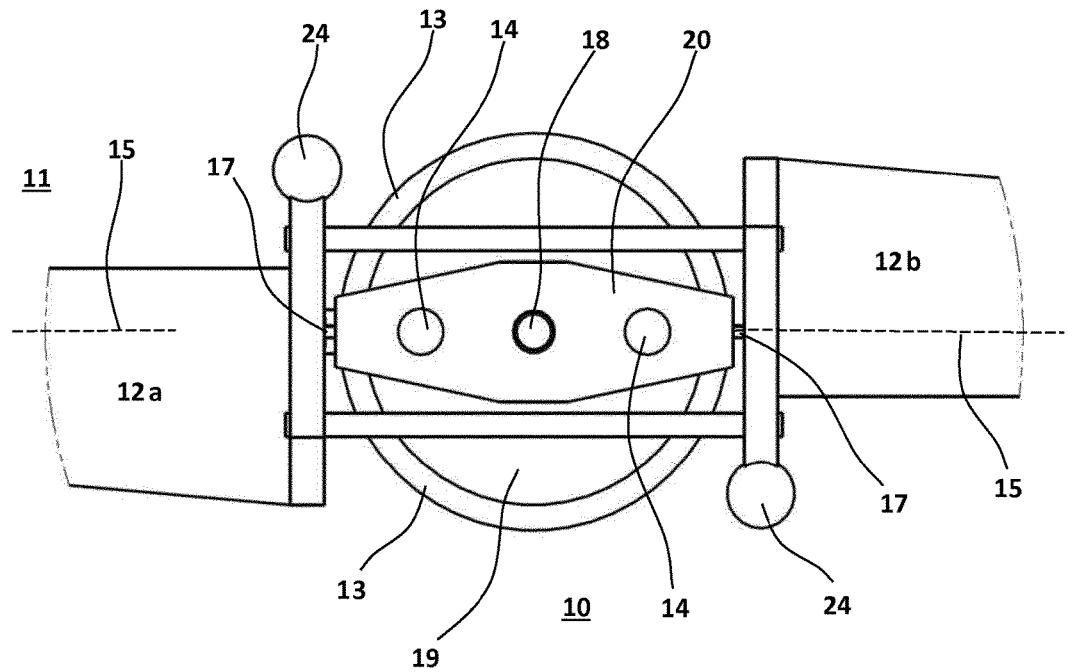
FIGS. 3a and 3b illustrate the thrust-generating rotor assembly from above and the side with nominal pitch and no alternation from nominal torque according to one embodiment of the present invention.
Figure 3B:
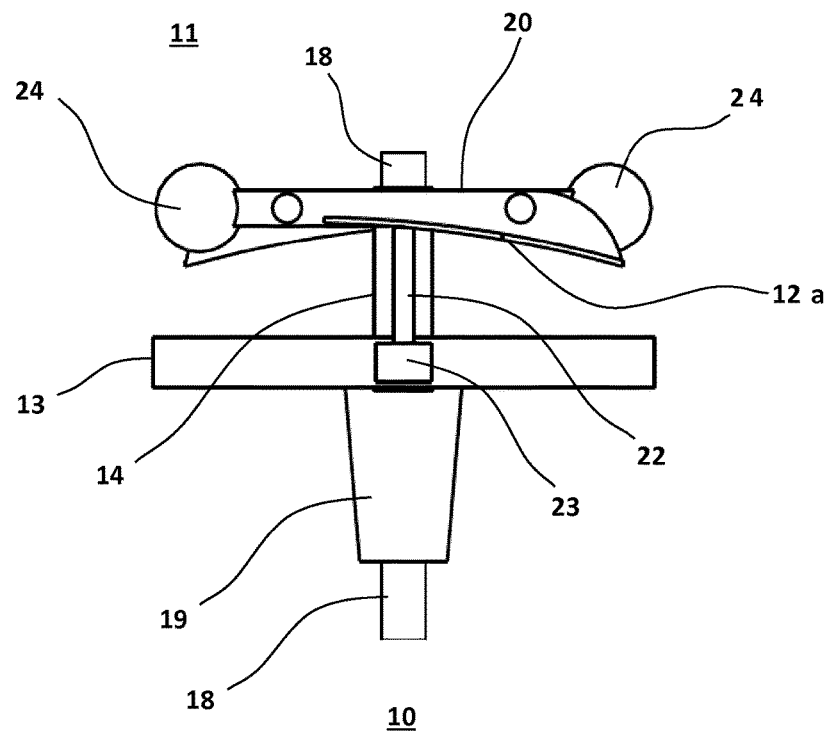

FIGS. 1, 2 and 3 show an example embodiment of a thrust-generating rotor assembly comprising a cyclic pitch control system. The rotor assembly comprises two sub-assemblies: a rotor blade assembly 11 and a rotor torque assembly 10.

The rotor blade assembly 11 again comprises two generally horizontally mounted and oppositely pointing rotor blades 12 having a predetermined airfoil, set at a predetermined nominal blade pitch angle 16. The rotor blade assembly 11 has a rotor blade axis 15 extending along a length of the blades 12 from a tip of one blade, e.g. the first rotor blade 12a, to a further tip of the opposite pointing blade, e.g. the second rotor blade 12b. The position of the rotor blades 12 and the predetermined nominal blade pitch angle 16 are adjusted to give the required thrust and dynamical stability of the rotor blade assembly 11 while rotating. In addition, two stabilizing flybars 24 are mounted to an inner end of each rotor blade 12. The generally horizontal stabilizing flybars 24 are typically mounted perpendicular to the rotor blade axis 15 and can take any shape. The flybars 24 are adjusted to counter and balance the properties of the rotor blade assembly 11 to make it dynamically stable during rotation. "Dynamically stable" refers to the effect that a tilted rotor blade assembly 11 with an asymmetrical blade pitch angle 16 of the two rotor blades 12 will, over time, achieve a level position with symmetrical blade pitch angle 16, due to the characteristics of the airfoil and stabilizing flybar 24 and the inertia- and aerodynamic-forces acting on the different elements.

The rotor blades 12 are allowed to change, or alter, their blade pitch angle 16 by means of pitch hinges 17 when subject to a tilting moment acting about the rotor blade axis 15. The pitch hinges 17 are mounted with their hinge axis generally in line with the rotor blade axis 15. In the example embodiment of the present invention, two pitch hinges 17 are mounted in the opposite outer ends of a centrally positioned connecting member 20. The connecting member 20 is allowed to rotate freely about a rotor shaft 18 in a plane perpendicular to the rotor shaft axis by means of a circular hole in the center of the connecting member 20.

Apart from the rotor shaft 18, the parts described above constitute the rotor blade assembly 11. However, in other embodiments of the present invention, specially designed and aerodynamically stable rotor blades may substitute the flybars 24. Rotor blades having an airfoil with a so-called reflex in the aft end, a trailing end that curves upwards, can give the rotor blade assembly 11 the required dynamic stability without the use of stabilizing flybars 24. Rotor blades 12 having a conventional airfoil may also be used in a stable rotor blade assembly 11 if they are positioned with their center of lift well behind the rotor blade axis 15.

The rotor blade assembly 11 is, as discussed above, positioned and centered about the rotor shaft 18 by the connecting member 20 and further connected to the rotor torque assembly 10 by means of spring members 14. Purely as an example, FIG. 1 to 3 show two spring members 14, made of a flexible material chosen to fit the torque range of a motor 30 that is connected to the rotor shaft 18. Alternatively, there can be a plurality of spring members 14 in different shapes and combinations of materials.

In one embodiment of the invention, the spring members 14 could be made from a rubber material with the desired elastic and flexible qualities. Alternatively, the spring members could be made from any elastic and/or flexible material, including synthetic rubber, composite fiber materials and spring-metal. A spring member 14 may also be made of a combination of materials, some parts rigid to add structural properties to the rotor assembly and some parts flexible to give the desired spring effect.

The rotor torque assembly 10 comprises the generally vertical rotor shaft 18 rotating about the rotor shaft axis, and a rotor head 19 fixed to the rotor shaft 18. Torque, driving the rotor is transferred from the rotor shaft 18 through the rotor head 19 and the spring members 14 to the rotor blade assembly 11. The motor 30 is typically connected to the lower end of the rotor shaft 18, either as a direct drive motor 30 or as a geared motor driving the rotor through a transmission.

Under operation, an alteration in torque from the motor 30 will result in forces acting on the spring members 14 which connect the rotor blade assembly 11 to the rotor torque assembly 10. The rotor torque assembly 10 has relatively low moments of inertia compared to the rotor blade assembly 11 and will start to change its rotational speed in response to any alternations in the applied torque from the motor 30. The rotor blade assembly 11, with its much higher rotational moments of inertia, will need a much longer time to change its rotational speed.

Figure 4A:
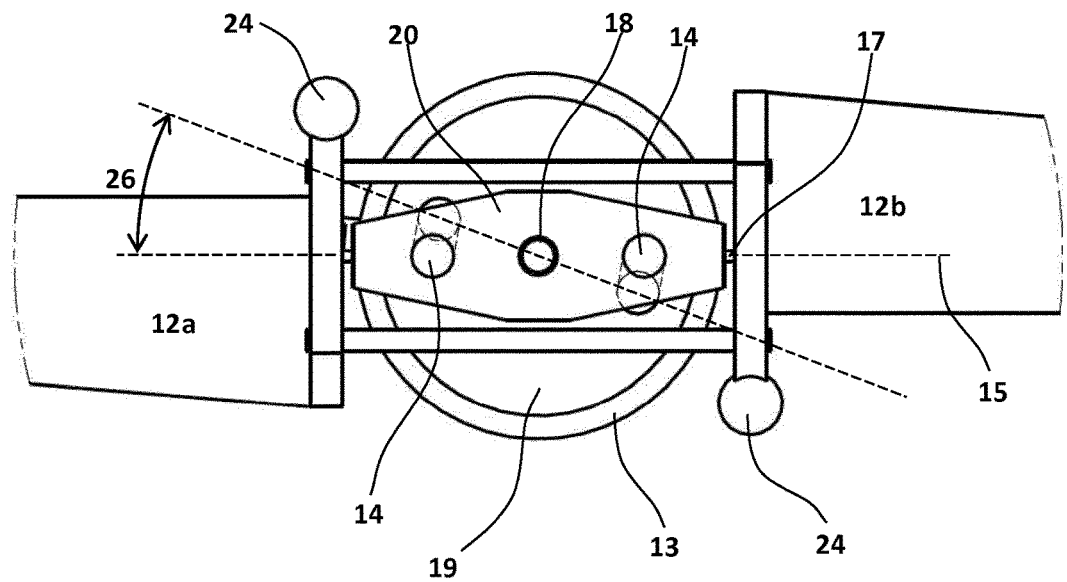
FIGS. 4a and 4b illustrate the thrust-generating rotor assembly from above and the side with positive pitch and a "rapid" positive alternation in torque according to one embodiment of the present invention.

In a traditional implementation of a rotor, the members connecting the rotor blades to the rotor head are rigid or adjusted to allow very little relative rotational movement between the rotor blades and the rotor head. In the present invention, however, the characteristics and the position of the spring members 14 imply that the inertia and drag forces acting on the rotor blade assembly 11 will cause a deformation or bending of the spring members 14 at an alteration in torque. This deformation will again result in an offset in the rotational position between the rotor blade assembly 11 and the rotor torque assembly 10. This offset is referred to as a "rotational offset" herein, and can be seen by comparing the top view of FIGS. 3a, 4a and 5a. The characteristics of the spring members 14 imply that the initial rotational offset 26 viewed in the rotor plane 25, a plane perpendicular to the rotor shaft axis 15 in which the rotor blades rotates, will move clockwise or counterclockwise relative to the rotor blade axis 15, when an alteration in torque is applied.

In short, the rotational offset 26 can be described as the result of inertia forces and aerodynamical drag forces acting on the rotor blades 12, causing the whole rotor blade assembly 11 to "lag behind" in its rotational movement. The drag forces balances out the nominal or constant rotor torque and gives an initial or nominal rotational offset 26 while inertia forces balances out alternations in torque and give clockwise or counterclockwise alternations in the rotational offset 26. The function of the cyclic pitch control system will be described in more detail later in this document.

A pitch arm 22 is mounted between the rotor blade assembly 11 and the rotor torque assembly 10. The pitch arm 22 is in one of its ends, upper or lower end, interacting with a damping member 13. A function of the pitch arm 22 is to create a tilting moment about the rotor blade axis 15 in order to alter the blade pitch angle 16 of at least one rotor blade 12. The pitch arm 22 is in this example embodiment mounted to, and extending down from, the inner end of a rotor blade 12 and is in its lower end connected to the rotor torque assembly 10 through a damping member 13. In alternative embodiments of the present invention, the damping member 13 could instead be mounted between the upper end of the pitch arm 22 and the rotor blade assembly 11 while the lower end of the pitch arm 22 is connected to the rotor torque assembly 10. The pitch arm 22 is always interacting with the damping member 13, and they can both have a number of different shapes and orientations.

In this example embodiment of the present invention, the pitch arm 22 is fixed to the inner end of a rotor blade, the first rotor blade 12a, and is extending vertically downwards. In the lower end, the pitch arm 22 has a pitch arm connection 23 linking it to a horizontally positioned and rotationally acting damping member 13. Purely as an example, the pitch arm connection 23 may constitute a ball member inside a member with a square vertical hole to allow the ball member to tilt freely back and forth, and to move up and down in the square hole while transferring forces in a generally horizontal direction. In one embodiment of the invention, the pitch arm 22 could be made from a rigid or stiff material with desired qualities. Purely as an example, the pitch arm 22 could be made from, for example, metal, carbon fiber composite or injection-molded plastic.

The damping member 13 is a speed dependent force- and position-transmitting member placed between the rotor blade assembly 11 and the rotor torque assembly 10, transferring tilting moments to at least one rotor blade 12 in order to control its blade pitch angle 16. In this example embodiment, the damping member 13 is centered about the rotor shaft 18 and is mounted to the rotor head 19.

The damping member 13 enables the cyclic pitch control system to work over a large span in rotor torque and it allows a dynamically stable rotor blade assembly 11 to regain a symmetrical blade pitch angle 16 over time, independent of the average rotor torque. These properties are preferred when the thrust-generating rotor assembly, comprising the control system, is to be used in an aircraft operating in wind or turbulent environment or if the aircraft is operating over a large span in flight speeds.

In one embodiment of the invention, the damping member 13 comprises a first concentric part and a second concentric part adapted to rotationally fit within each other. The damping member 13 further incorporates a desired damping material filling a predefined gap between the first and second concentric parts. Viscous properties of the damping material may be chosen to limit, or cancel, movement of the second concentric part with respect to the first concentric part when there is a rapid change in the rotational speed, or position, of the first part. At the same time, the viscous properties of the damping material allow larger movement of the second concentric part with respect to the first concentric part if the changes in rotational speed or position are slow. In other words, the first and second concentric parts in the damping member 13 generally follow each other's rotational movement when the movement is rapid, but not necessarily, when it is slow. Further, in this document, the movement of one of the concentric parts in relation to the other concentric part is referred to as the damping member offset.

A "rapid" movement or alteration described in this document refers to alterations or changes that occur in less than one rotation of the rotor. Typically, a rapid change will be a change in one direction that is completed within half a rotation of the rotor. A cyclic alternation in torque is an example of a rapid alteration. A "slow" alteration described in this document refers to an alteration that takes more than one rotation of the rotor to complete. Typically, these slow alterations occur over two or more rotations of the rotor. Graduate or incremental changes in torque to obtain a new rotational speed of the rotor are examples of slow alternations.

Many different materials and designs may be utilized in the damping member 13. Purely as an example, the damping member 13 could be a passive damping member, and incorporate a material that gives the desired properties under stress. In one embodiment of the invention, the damping member 13 incorporates a passive damping member material that could be a viscous material, e.g. a paste or an oil, having a viscosity that fit the physical properties of the rotor. Carefully designed damping members 13 using friction and air as a damping member material is also possible. Another example is a combination of permanent magnets and a non-magnetic metallic material, e.g. aluminum, which utilize the so called Lenz effect to build a passive damping member without the use of a liquid or paste-like material. This alternative embodiment depends on speed induced electromagnetic forces that affect friction between the magnet and the metallic material, and due to the lack of temperature dependent materials, has an advantage in a very cold environment.

Alternatively, the damping member 13 may incorporate an active damping member material and comprise, for example, electro magnets reacting to input signals from a motor control system 31. Purely by way of example, the damping member 13 could be fitted with a combination of an active and passive damping member material. The damping properties of the damping member 13 do not necessarily have a strict linear or quadratic function in relations to its movements, but it is chosen based on the force it needs to transfer and the frequency of torque alternations i.e. the rotational speed of the rotor 12. The damping member 13 may, however, preferably be designed in a way that enables the tilting moment being transferred through it to follow the rate of said changes in rotational offset 26 in a predictable manner.

In the example embodiment of the present invention and based on the descriptions above, it can now be seen that: A rapid change in the rotational offset 26 will, through the pitch arm connection 23, cause the lower end of the pitch arm 22 to start moving and thereby create a tilting moment about the rotor blade axis 15. When the forces acting through the pitch arm 22 are large enough to overcome the inertia (about the rotor blade axis 15), the rotor blades 12 including the flybars 24 and the pitch arm 22 will start to tilt about the rotor blade axis 15 and eventually the blade pitch angle 16 will change.

Moreover, the rotor torque assembly 10 is connected to the motor 30 as a means of rotating the rotor. Further, the position of the first rotor blade 12a, the blade connected to the pitch arm 22, is monitored via a rotor control sensor 32. Purely as an example, the rotor control sensor 32 could be a magnetic sensor which is adjusted to provide signals representative of the position of the rotor blades 12. Alternatively, the rotor control sensor 32 could be any kind of position sensor, for example an optic senor, a potentiometer, a magnetic sensor or an acoustic sensor. The control sensor 32 is further connected to a motor control system 31 for providing input signals for controlling the motor 30. The motor control system 31 is further provided with means to receive flight command inputs from a pilot or an autopilot, not shown.

The previously mentioned rapid or slow alterations in torque initiated from the motor control system 31 through the motor 30, are utilized as means of providing a cyclic change in blade pitch angle 16 for maneuvering the aircraft. As mentioned earlier, cyclic implies that these alterations in torque occur at a desired position, and are repeated in several rotations of the rotor to achieve the desired movement of the aircraft. As will be explained, a rapid cyclic alteration in torque will provide a respective movement of the aircraft in a horizontal direction. Alternatively, a slow alteration in torque can be applied to change the rotational speed of the rotor to provide a movement in a vertical direction. These rapid and slow alterations in torque may be applied in any combination and at any point during the rotation of the rotor to provide the desired movements of the aircraft in all directions.

Figure 4B:
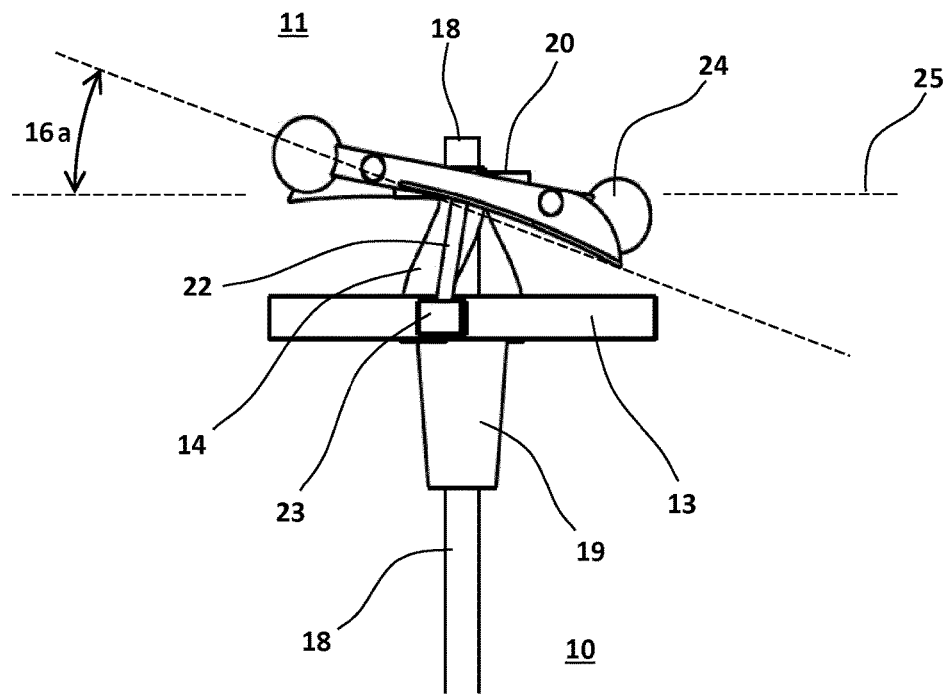

The example embodiment shown in FIGS. 1, 2 and 3 will now be further described and discussed in detail. The stepwise explanation below is supported by the drawings in FIG. 4 to 6.

A Rapid Positive Alteration in Torque, FIG. 4:

To increase the blade pitch angle 16a on a first rotor blade 12a from a nominal blade pitch angle, a rapid positive alteration in torque is applied from the motor 30. In other words, the rotor torque is rapidly increased. Compared to the rotor blade assembly 11, the rotor torque assembly 10 has very low rotational moments of inertia and is connected to the rotor blade assembly 11 by spring members 14 and a pitch arm 22. This enables the motor 30 to slightly, and almost instantly, increase the rotational speed of the rotor torque assembly 10 when additional torque is applied.

Since the rotor blade assembly 11 is not fixed to the rotor head 19, but instead rely on the spring members 14 to transfer the rotor torque from the rotor torque assembly 10 to the rotor blade assembly 11, and since the rotor blade assembly 11 has a much higher rotational moments of inertia, its acceleration becomes slower. A result of the slower acceleration is that the rotor blade assembly 11 will start to "lag" compared to the rotor torque assembly 10. This difference in rotational position is previously defined as the rotational offset 26.

With a rapid increase in torque from the motor 30, the increase in rotational offset 26 starts to build up within a fraction of a revolution. Now, looking at the damping member 13 mounted on the rotor head 19, and keeping in mind that the alteration in speed and rotational offsets is rapid, it can now, based on previous descriptions of the characteristics of the damping member 13, be understood that the second, outer concentric part of the damping member 13 will generally follow the movement of the first concentric part and the rotor head 19. The pitch arm 22 is, at its lower end, connected to the second concentric part via the pitch arm connection 23. Since the alteration in torque is rapid and the pitch arm 22 is, in this example embodiment, connected to the rotor blade 12a at its upper end, it will have to tilt to accommodate the increased rotational offset 26.

The rotational offset 26 and the tilting of the pitch arm 22 will, however, not happen instantaneously because of the inertia forces, resulting from the stabilizing flybars 24 acting about the rotor blade axis 15. In the initial phases of building up a rotational offset 26, not all of the torque transferred to the rotor blade assembly 11 will go through the spring members 14. Some of the force will instead act through the pitch arm 22, resulting in the following. Firstly, the forces acting from the second concentric part of the damping member 13 on the lower end of the pitch arm 22 will, until the arm and the rotor blade assembly is actually tilted, contribute to a small acceleration in the rotational speed of the rotor blade assembly 11. Secondly, the same force will, however, at the same time create a tilting moment about the rotor blade axis 15, starting to tilt the rotor blades 12, countered by the inertia forces resulting from the stabilizing flybar 24 and differences in aerodynamic forces acting on the two rotor blades 12a, 12b. As the rotor blades 12, the flybar 24 and the pitch arm 22 tilts, the rotational offset 26 increases. Further, as the rotational offset 26 increases, the spring members 14 deforms and bends more and more, transferring a larger part of the increased torque from the rotor torque assembly 10 to the rotor blade assembly 11. When the rotor blades in the rotor blade assembly 11 tilts as described, the lower end of the pitch arm 22 moves forward in the direction of rotation, and the first rotor blade 12a tilts up, resulting in a higher blade pitch angle 16a. Since the two rotor blades are rigidly mounted together, the oppositely pointing rotor blade 12b will experience a decrease in blade pitch angle. The increase, and decrease, in blade pitch angle 16 and increase in rotational offset 26 continues until all of the increase in rotor torque (the positive alteration in torque) goes through the spring members 14.

To have sufficient control over how much the blade pitch angle 16 increases and how long time it takes to reach a maximum, it is preferred to match the level of alterations in torque to the rotational moments of inertia of the rotor blade assembly 11, the properties of the spring members 14 and the inertia of the flybars 24. A heavy rotor blade assembly 11 requires larger aerodynamic forces to tilt the rotational plane 25 and therefore typically needs a higher change in torque, with a corresponding change in blade pitch angle 16, compared to a lighter rotor blade assembly 11. Flybars 24 with high mass and stiff spring members 14 typically require a higher change in torque, while flybars 24 with low mass and soft spring members 24 require a lower change in torque. The weight, i.e. inertia, of the flybars 24 also influences the timing. Heavy stabilizing flybars 24 result in a longer time from a change in torque is initiated until the maximum change in blade pitch angle 16 is reached. Heavy and/or long flybars therefore require the motor control system 31 to start the increase in torque earlier in the rotation than would have been the case for a rotor blade assembly 11 with smaller or no flybars.

It is also preferred to match the properties of the damping member 13 to the ratio of change in torque, i.e. to the rotational speed of the rotor. A slowly rotating rotor typically requires a larger diameter damping member 13, or a damping material or fluid with a higher viscosity, than a faster rotating rotor.

To conclude, a rapid increase in torque creates an increased blade pitch angle in a first rotor blade and a decreased blade pitch in the oppositely pointing blade.

Figure 5A:
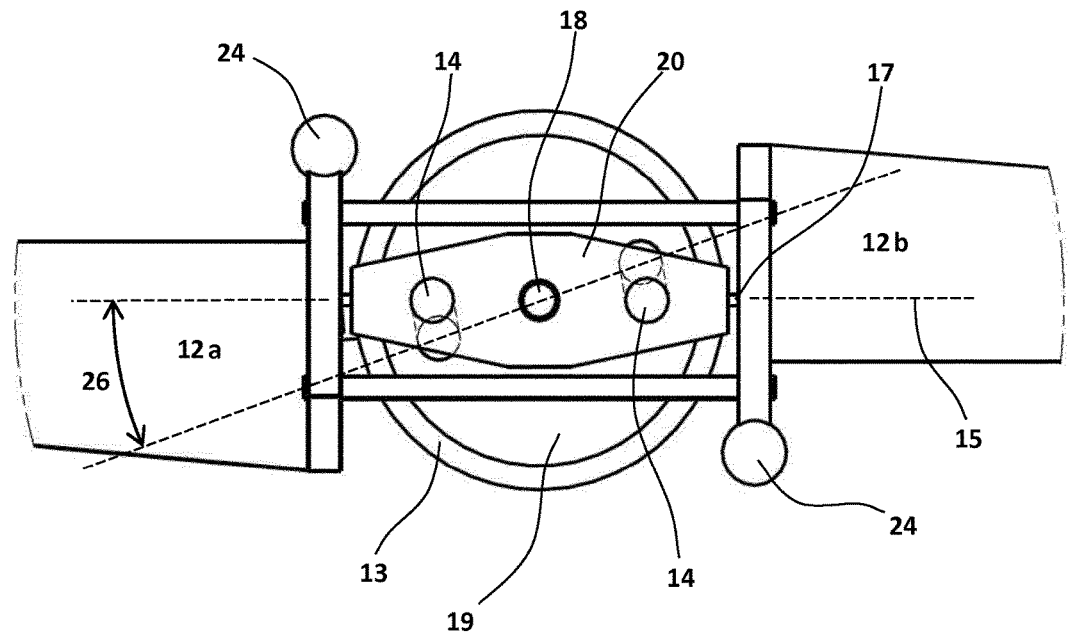
FIGS. 5a and 5b illustrate the thrust-generating rotor assembly from above and the side with negative pitch and a "rapid" negative alternation in torque according to one embodiment of the present invention.
Figure 5B:
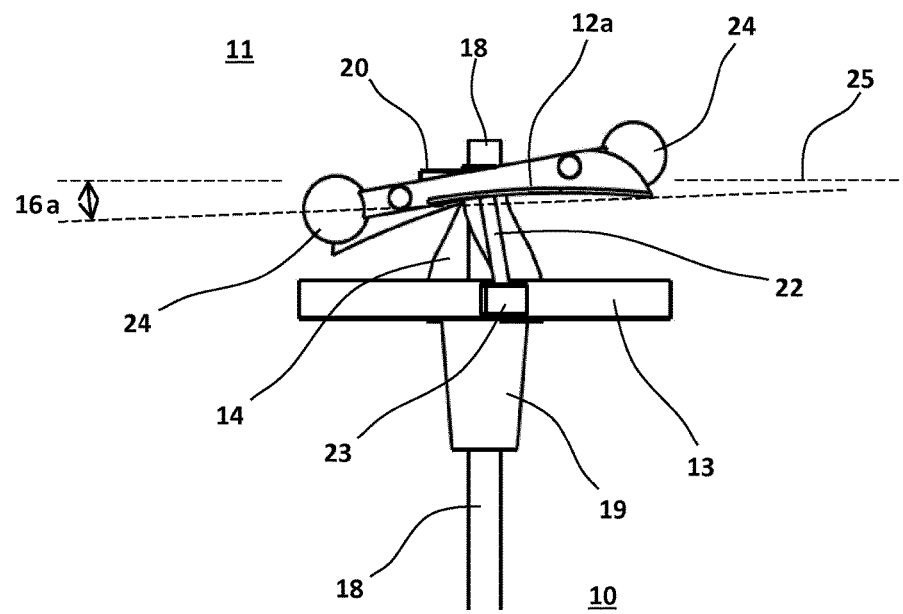

A Rapid Negative Alteration in Torque, FIGS. 5*a* and 5*b*:

To reduce the blade pitch angle 16*a* on a first rotor blade 12*a* from a nominal blade pitch angle, a rapid negative alteration in torque is applied from the motor 30. In other words, the rotor torque is rapidly decreased. In this case, the large rotational moments of inertia of the rotor blade assembly 11 results in a negative change in the rotational offset 26. The rotor blade assembly 11 will need some time to slow down, while the rotor torque assembly 10 starts reducing the rotational speed immediately. The time needed to slow down the rotor, results in the rotor blade assembly 11 starting to "move ahead" with respect to the rotor torque assembly 10.

Looking at the spring members 14, the stabilizing flybars 24; the damping member 13 and the pitch arm 22, the opposite action of what happened during a positive alteration in torque is now taking place.

Because the alterations in torque is rapid, the second, outer concentric part of the damping member 13 will, due to the properties of the damping material, generally follow the movement of the first concentric part and the rotor head 19. Thereby, as the rotational offset 26 starts to go down, the lower end of the pitch arm 22 is pulled back from its current position. Again, because of the stabilizing flybar inertia, the rotor blade assembly 11 and the pitch arm 22 will not be allowed to immediately tilt. The forces acting thorough the pitch arm 22 will instead set up a tilting moment about the rotor blade axis 15, i.e. start to tilt the rotor blade assembly 11 in a negative direction. As the rotor blades 12, the flybars 24 and the pitch arm 22 tilts, the rotational offset 26 decreases, or becomes negative.

When the rotor blade assembly 11 tilts as described, while the lower end of the pitch arm 22 moves backward relative to the direction of rotation, the first rotor blade 12*a* tilts down, ending up having a lower blade pitch angle 16*a*. The oppositely pointing rotor blade 12*b* will on the other hand end up with a higher blade pitch angle. The reduction, and increase, in blade pitch angle 16 and decrease in rotational offset 26 continues until the decrease in rotor torque, i.e. negative alteration in torque, again is balanced by the spring members 14.

To conclude, a rapid reduction in torque creates a decreased blade pitch angle in a first rotor blade and an increased blade pitch in the opposite pointing blade.

Figure 6A:
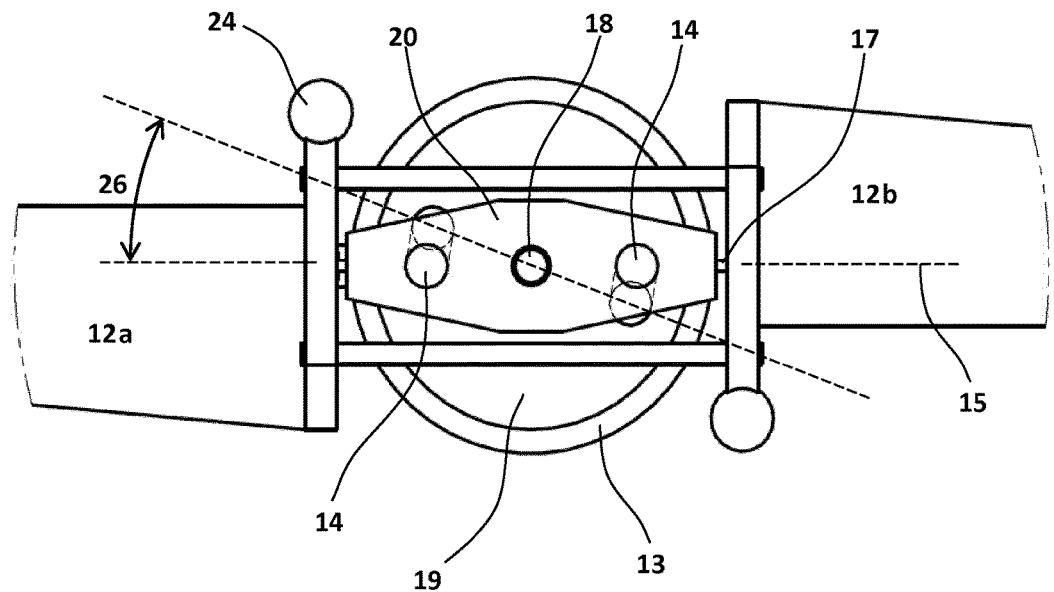
FIGS. 6a and 6b illustrate the thrust-generating rotor assembly from above and the side with nominal pitch and a very "slow" positive alternation in torque according to one embodiment of the present invention.
Figure 6B:
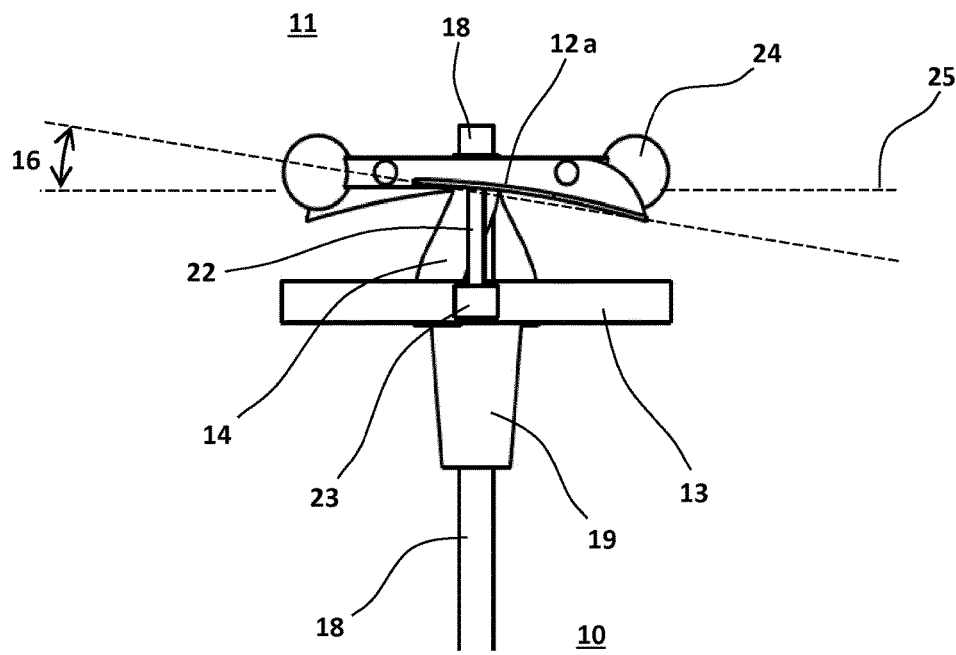

A Slow Alteration in Torque, FIGS. 6*a* and 6*b*:

A difference between a rapid and a slow alternation in torque is in the way the damping member 13 reacts to the different rates of change. As described above, a rapid change in torque leading to a rapid change in rotational position or speed of the first concentric part of the damping member 13 causes the second concentric part to follow the movements of the first part and the rotor torque assembly. If, however, the change is slow, the properties of the damping member 13 will allow the second concentric part to "slip" and not follow the movement of the first concentric part if a force is acting against this movement. The relative movements between the two concentric parts can then greatly differ. As can be remembered from the discussion of rapid changes above, the movements of the pitch arm 22 is held back or restricted by inertia forces arising from the rotor blade assembly 11 including the stabilizing flybar 24.

If the alterations in torque are rapid, the forces transferred through the damping member 13 are large enough to overcome the stabilizing inertia forces and start tilting the rotor blades 12. However, if the alternations in torque are slow, the second concentric part of the damping member 13 will start to slip instead of transferring forces via the pitch arm connection 23 to the lower end of the pitch arm 22. Instead, a damping member offset is obtained and less force is transferred. In this case, the force acting on the pitch arm 22 is not large enough to overcome the inertia forces from the flybars 24 and the rotor blade assembly 11, the flybars 24 and thereby the blade pitch angle 16 will remain generally unchanged.

In FIGS. 6*a* and 6*b* a situation with a slow increase in rotor torque is shown. The only difference between this situation and the nominal state, is that the spring members 14 are slightly more twisted or bent in response to the larger torque. The rotational offset 26 is slightly larger than a nominal offset, however the remaining structure is level and in balance.

The situation in FIGS. 6*a* and 6*b* is identical to a situation where a positive change in torque, increased torque, has become permanent, e.g. an increased rotational rotor speed. If the state of increased torque becomes permanent, the torque is countered only by the aerodynamic drag from the rotor and no inertia forces are active.

The slow alteration in torque described above, is a very slow alteration, taking place over a large number of rotor revolutions. In practical situations, the changes could very well be faster, but still defined as slow. In such a case, the damping member 13 will only slip a little, and still transfer some amount of force to the pitch arm 22. The rotor blades 12 will experience a small constant offset in blade pitch angle 16. If the change in torque is positive the blade pitch angle 16*a* of the first rotor blade 12*a* will be slightly increased and the blade pitch angle of the opposite blade will be slightly lower, until the rotor again levels out and is stabilized. A slow negative change will have the opposite effect on the blade pitch angles 16.

To conclude, a slow alteration in torque will typically lead to a change in rotational speed of the rotor, but only to minor, and not permanent, changes in blade pitch angle.

A Rapid but Permanent Change in Torque, FIGS. 4*a*, 4*b*, 6*a* and 6*b*:

To explain what happens when a rapid change in torque becomes permanent, e.g. a rapid increase in torque to obtain a higher rotational speed, for example to quickly increase the trust from the rotor, one can combine the effects described above for a rapid and a slow alternation in torque.

With a rapid increase in torque from the motor 30, the increase in rotational offset 26 starts to build. Because the change is rapid, the second concentric part of the damping member 13 will follow the movement of the first concentric part and the rotor torque assembly 10, thereby starting to tilt the pitch arm 22.

In the initial phases of building up the rotational offset 26, not all of the torque transferred to the rotor blade assembly 11 will act through the spring members 14. As discussed previously, some of the force will instead act through the pitch arm 22, creating a tilting moment about the rotor blade axis 15, starting to tilt the rotor blade assembly 11, countered by inertia forces. When the rotor blade assembly 11 tilts as described, the lower end of the pitch arm 22 moves forward in the direction of rotation, and the first rotor blade 12a tilts up, resulting in a higher blade pitch angle 16a. The second rotor blade 12b tilts down.

This state of increased, and decreased, blade pitch continues as long as the torque is increasing, but as soon as the torque change levels out, the second concentric part of the damping member 13, will start to slip and not transfer the same amount of forces via the pitch arm 22. A dissymmetry in the aerodynamic forces acting on the rotor blades 12 and the stabilizing flybars 24 will instead try to bring the rotor blade assembly 11 and the rotor blades 12 back to a level state with the initial blade pitch angles 16 on both blades. The stabilizing forces rotates the rotor blade assembly 11 about the rotor blade axis 15 and pushes the lower end of the pitch link 22 back relative to the rotational direction the rotor. The second concentric part of the damping member 13 continues to slowly slip and move backwards until the pitch arm 22 becomes vertical. At this point we are back to a nominal state, but with a higher rotational speed, higher torque, more deformed and bent spring members 14 and a higher thrust generated by the rotor.

The ability the control system and the rotor in the present invention have to obtain or return to a nominal blade pitch state at different rotor torque levels makes it possible for an aircraft employing such a system to have controlled, vibration-free flight under different speeds and environmental conditions.

To conclude, a rapid but permanent change in torque will lead to a change in rotational speed of the rotor. A disymmetry in blade pitch angle will be present during the change, but both the blade pitch angle and the damping member will return to their nominal states as soon as the new torque level is reached.

Control of an Aircraft Through Alternations in Torque:

Controlling the horizontal movements of a helicopter or rotary wing aircraft requires changes in blade pitch angle as described above, but these changes are preferably applied carefully at the correct position in the rotational plane to obtain the desired effect.

To initiate e.g. a forward movement, it is necessary to, over some time, increase the lift of the rotor towards an aft end of the aircraft to tilt the rotor and eventually the aircraft forward. In this manner, the rotor is titled forward. Consequently, the initially vertical thrust used to sustain the aircraft gets a horizontal component that in turn pulls the aircraft forward. This way, the aircraft can be controlled in all horizontal directions by increasing the lift in desired positions in the rotor's rotational plane 25. In the present invention, the increase in lift, or thrust, is achieved by increasing the blade pitch angle 16 of one rotor blade 12 and decrease the blade pitch angle 16 of the opposite pointing rotor blade.

The changes in blade pitch angle 16 are cyclic. This means that for a given control command the maximum blade pitch angle 16 may preferably occur in the same position, in several consecutive revolutions of the rotor. While observing a rotor blade 12 through a revolution, it can be seen that the blade goes through a cycle of maximum blade pitch angle in one position, to a minimum pitch angle after 180 degrees—and back up to a maximum after a full revolution. Since the two rotor blades 12 in the rotor of the example embodiment of the present invention are rigidly connected and pointing in opposite directions it will be obvious that when one rotor blade 12 has a maximum blade pitch angle 16 the opposite blade may preferably have a corresponding minimum angle.

In one embodiment a motor control system 31 adjusted to provide these cyclic changes in blade pitch angle 16 utilize a repetitive sequence of rapid positive and negative alteration in torque according to the present invention. To be able to apply the positive and negative changes in rotor torque correctly, it is preferred that the motor control system 31 knows the position of the blades 12 in the rotation. This is done by virtue of a rotor control sensor 32 as previously explained. Purely as an example, the rotor control sensor 32 can register every time a certain position of the rotor passes the control sensor 32. Further, by monitoring the time between when the control sensor 32 registers a revolution, the motor control system 31 can calculate the precise position of a rotor blade 12 throughout the next revolution. When the motor control system 31 combines the input from the pilot with the calculated, or measured, position of the rotor blades 12, it can know exactly when to apply a change in torque—and the amount of the change necessary.

Depending on the rotational speed, the rotational moments of inertia, and the properties of the stabilizing flybar 24 the changes in torque may preferably be applied some time before a change in blade pitch angle 16 is required. The exact advance in time can be determined through calculations, simulations or through practical tests with a fully functional rotor and control system.

To control the aircraft in a vertical direction, a slow or permanent change in rotor torque is applied until the rotational speed and thereby the thrust from the rotor has changed as required to control the vertical speed of the aircraft.

Alternative Embodiments of the Present Invention

Figure 7A:
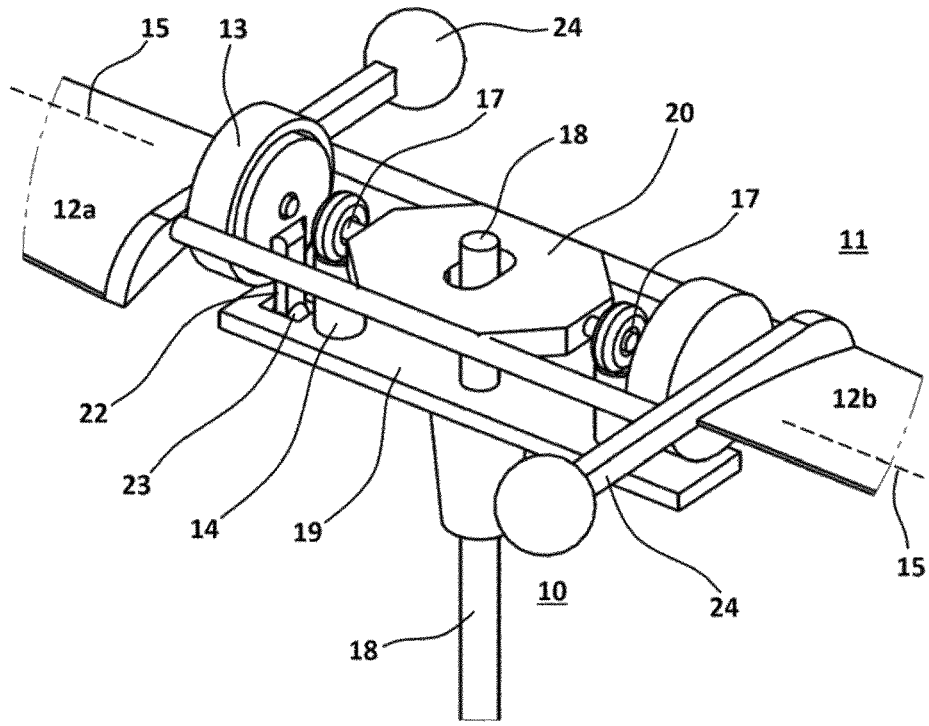
FIGS. 7a and 7b illustrate perspective views of an alternative embodiment of a thrust-generating rotor assembly.
Figure 7B:
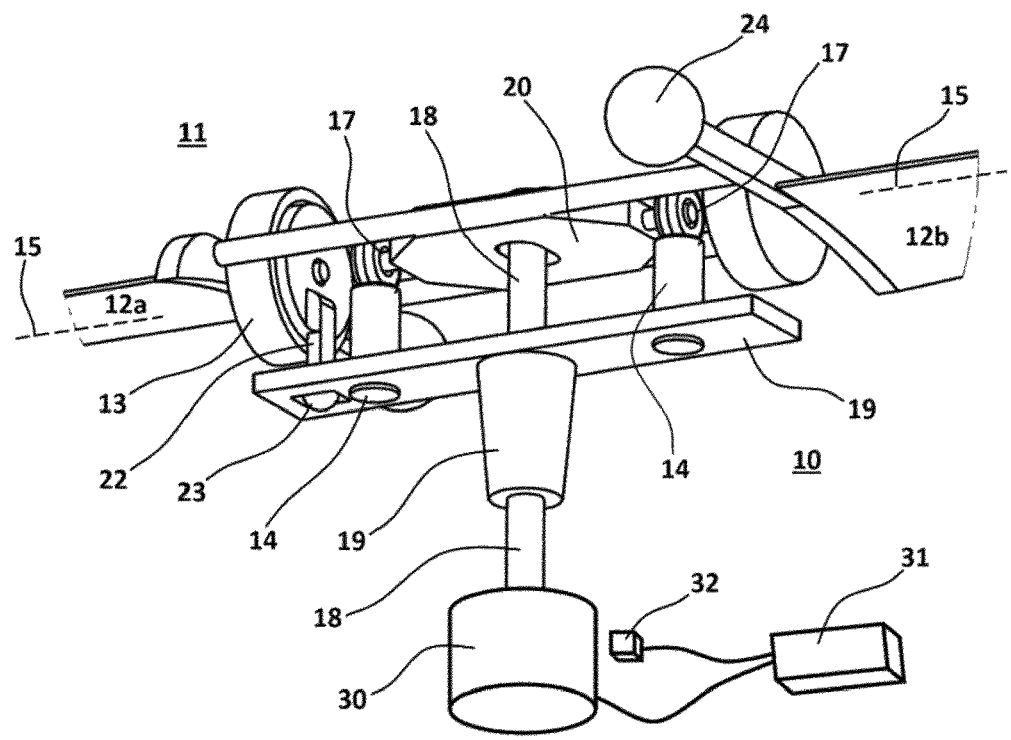
Figure 8A:
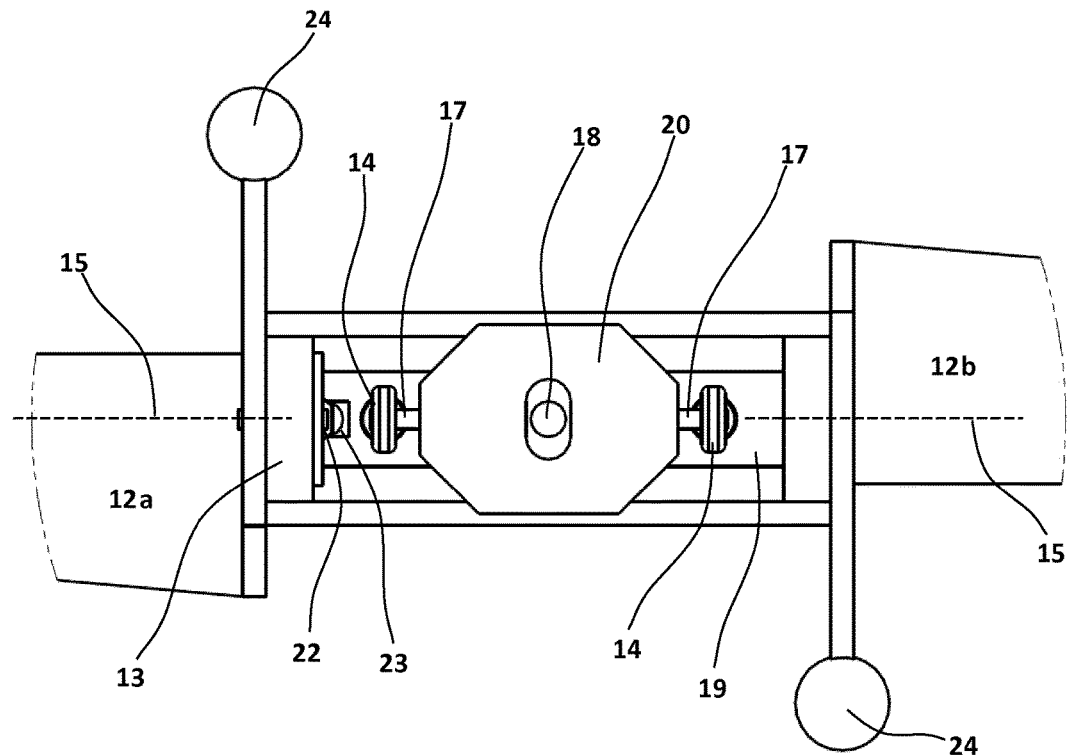
FIGS. 8a and 8b illustrate an alternative embodiment from above and the side with nominal pitch and no alternation from nominal torque.
Figure 8B:
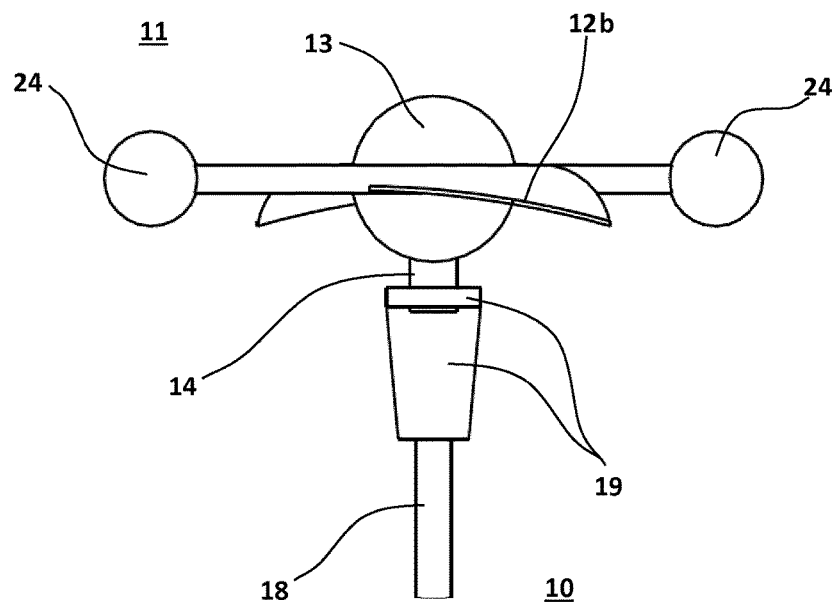
Figure 9A:
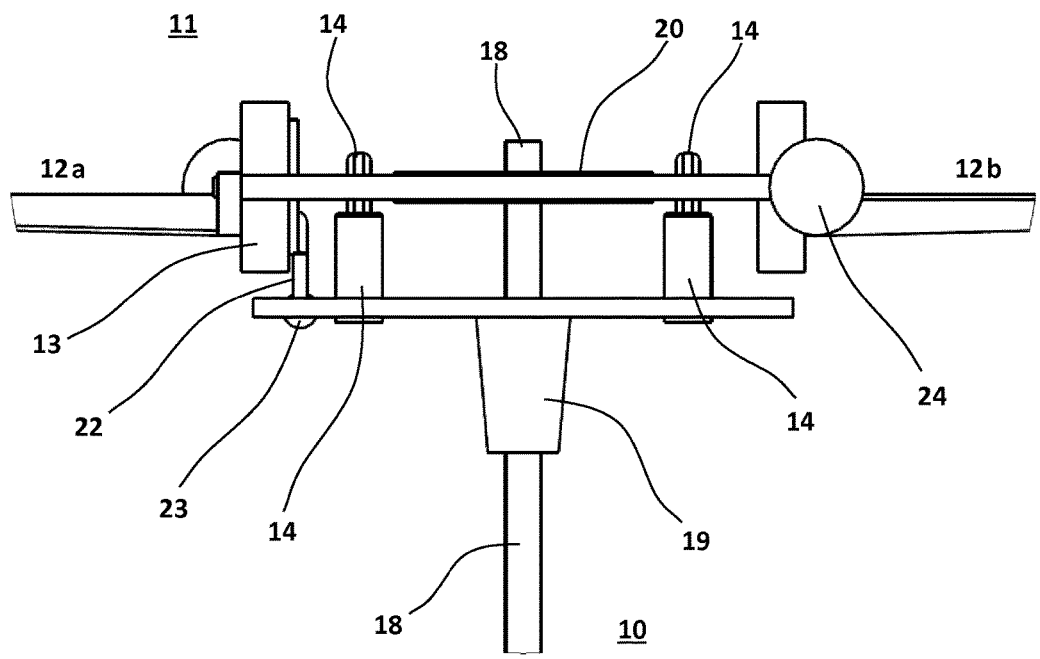
FIGS. 9a and 9b illustrate an alternative embodiment from the front in a plane view and in a plane cut-through view.
Figure 9B:
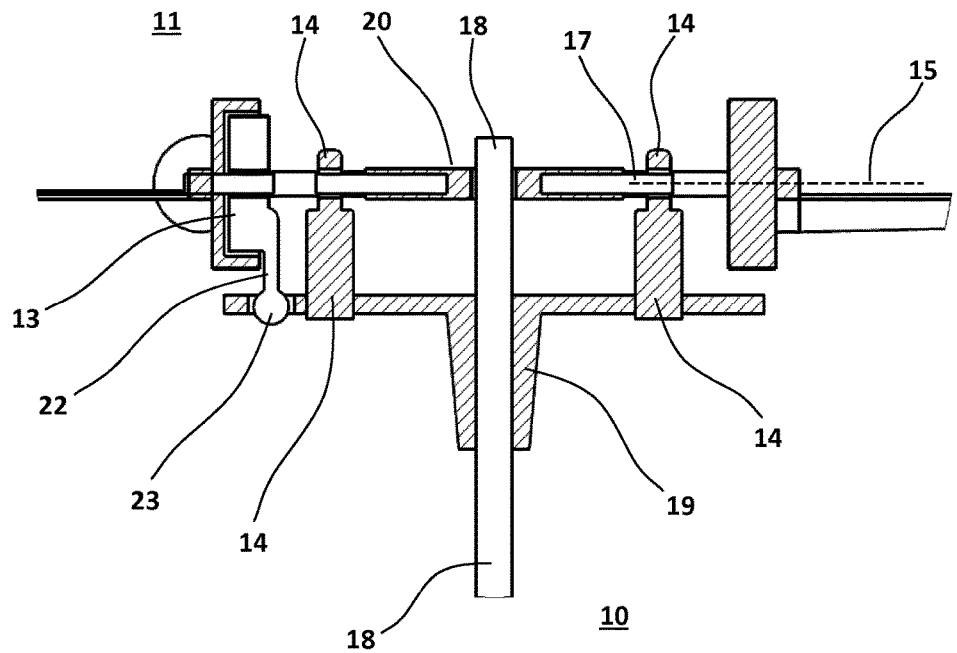

An alternative embodiment of the present invention is shown with reference to FIG. 7 to 9. In this example embodiment the damping member 13 is separated from the rotor head 19 and instead mounted with its rotational axis lined up with the longitudinal rotor blade axis 15. Purely by way of example, the damping member 13 may be positioned in the base, the inner end, of the first rotor blade 12a, and be of a size to fit the base of the rotor blade 12a. Alternatively, there may also be a dummy member mounted on the oppositely pointing rotor blade, the second rotor blade 12b. The dummy member functions as a counterweight to the damping member 13 and keeps the rotor balanced.

As in the previously discussed embodiments, the damping member 13 comprises a first concentric part adjusted to rotationally fit inside a second concentric part. The second concentric part of the damping member 13 is mounted to the rotor blade assembly 11. The upper end of a pitch arm 22 is connected to the first concentric part of the damping member 13 while the lower end of the pitch arm 22 is connected to the rotor head 19 through a rotor arm connection 23.

Identical to embodiments described earlier, the damping member 13 incorporates a desired damping material filling a predefined gap between the two parts. The viscous property of the damping material is chosen such that the second concentric part, and the rotor blade assembly 11, follows the movement of the first concentric part if there is a rapid change in the rotational speed or position of the first part. At the same time, the properties of the damping material allow movement of the first concentric part with respect to the second part if the changes in rotational speed or position are slow.

In this alternative embodiment of the present invention, the spring members 14 are built up of two parts, one elastic part fixed to a rigid part. The elastic part is typically mounted to the rotor head 19 positioned below the rotor blade assembly 11. The rigid part is typically the upper part of the spring element 14 and ends in a pitch hinge 17. In this alternative embodiment, the connecting member 20 is fixed to the remainder of the rotor blade assembly 11 and follows the tilting of the rotor blades 12. To accommodate both the rotation about the rotor shaft 18 and the tilting about the rotor blade axis 15 the connecting member 20 comprises an oval central hole.

With a rapid increase in torque from the motor 30, an increase in rotational offset 26 will build up. The pitch arm 22 is, at its lower end, connected to the rotor head 19 via the pitch arm connection 23. The pitch arm 22 is, at its upper end, connected to the first concentric part of the damping member 13. The increasing rotational offset 26 therefore causes the rotor arm 22 to start tilting. Since the change in torque is rapid, the pitch arm 22 and the damping member 13 create a substantial tilting moment about the rotor blade axis 15.

If, however, the change in torque is slow, the first concentric part of the damping member 13 may instead slip, or slide, with respect to the second part. This results in the same tilted pitch arm 22, but without creating the same tilting moment about the rotor blade axis 15.

The function and control of this alternative embodiment follow exactly the example embodiment discussed in detail above.

Further Alternative Embodiments:

The present invention may take on many different forms and shapes. E.g. while studying different embodiments of the damping member 13 herein, further alternative embodiments may be realized. Typically, the function of the control system will be maintained as long as a first part of the damping member 13 is linked to the movement of the rotor torque assembly 10 and a second part of the damping member 13 is linked to the tilting (to change pitch angle) of the rotor blade blades 12 and a damping means between the two damping member parts is adjusted so the two parts generally follow each other's movements at rapid or cyclic changes in the speed and position of the rotor torque assembly 10 and allow the movement of the two parts to differ with respect to each other at a slow or permanent change in the speed and position of the rotor torque assembly 10.

In yet another alternative embodiment of the present invention the stabilizing flybars 24 may take different form or shapes. The flybars 24 can be positioned further out on the rotor blades 12, they can be extending longer or shorter out from the rotor blades 12, be angled up or down with respect to the rotational plane or they can be molded as an integral part of the rotor blades.

The invention claimed is:

1. A thrust-generating rotor assembly comprising:
    a rotor torque assembly rotationally connected to a rotor blade assembly comprising rotor blades configured to tilt about a rotor blade axis according to a blade pitch angle; and
    a cyclic pitch control system comprising:
        at least one spring member connected between the rotor torque assembly and the rotor blade assembly about its axis of rotation and configured to transfer changes in rotor torque into proportional changes in rotational offset between the rotor torque assembly and the rotor blade assembly without introducing tilting moments about the rotor blade axis, and
        a rotating damping member comprising a first concentric part and a second concentric part adapted to fit together with a damper between the two parts and interact with a pitch arm to transfer the changes in rotational offset into substantial tilting moments about the rotor blade axis at rapid changes in rotor torque and to cancel or limit the tilting moments at slow or permanent changes in rotor torque, wherein the tilting moments act on at least one rotor blade to control the blade pitch angle.

2. A thrust-generating rotor assembly according to claim 1, wherein the damping member is configured to enable the tilting moments to predictably follow the rate of the changes of rotational offset.

3. A thrust-generating rotor assembly according to claim 1, wherein the rotor blade assembly comprises dynamically stable rotor blades and/or a stabilizing flybar configured to create a stabilizing tilting moment about the rotor blade axis in response to an asymmetric blade pitch angle in the rotor blade assembly.

4. A thrust-generating rotor assembly according to claim 1, wherein the rotor torque assembly comprises a rotor shaft having a rotor shaft axis and a rotor head fixed to the rotor shaft, wherein the pitch arm comprises an upper end and a lower end.

5. A thrust-generating rotor assembly according to claim 1, wherein the rotor blade assembly comprises a connecting member configured to rotationally connect the rotor blade assembly to the rotor torque assembly and allow rotational movement between and/or limit planar movement of the rotor torque assembly and the rotor blade assembly.

6. A thrust-generating rotor assembly according to claim 1, wherein the rotor blade assembly comprises a first blade and a oppositely pointing second blade respectively being allowed to alter their blade pitch angle using pitch hinges mounted along the rotor blade axis, and wherein the pitch arm is connected to the first blade.

7. A thrust-generating rotor assembly according to claim 1, wherein the damping member and the damper are configured such that the two concentric parts generally follow each other's movements at rapid or cyclic changes in the speed and position of the first concentric part, and allow movements of the concentric parts to differ with respect to each other at a slow or permanent change in the speed and position of the first concentric part.

8. A thrust-generating rotor assembly according to claim 7, wherein:
    the damping member is mounted on a rotor head, positioned and centered around a rotor shaft of the rotor torque assembly;
    the concentric parts of the damping member are configured to rotate in a plane perpendicular to the rotor shaft axis;

an upper end of the pitch arm is connected to the rotor blade assembly; and a lower end of the pitch arm is connected to the damping member by a hinged pitch arm connection.

9. A thrust-generating rotor assembly according to claim 7, wherein:

the damping member is mounted on the rotor blade assembly;

the concentric parts of the damping member are configured to rotate in a plane generally perpendicular to the rotor blade axis;

the second concentric part is fixed to the rotor blade assembly;

the first concentric part is connected to an upper end of the pitch arm; and a lower end of the pitch arm is connected to a rotor head of the rotor torque assembly by a hinged pitch arm connection.

10. A thrust-generating rotor assembly according to claim 1, wherein:

the damping member and/or the damper comprises a passive damping member material, a passive electromagnetic damper, an active damping member material, and/or an active electromagnetic damper.

11. A thrust-generating rotor assembly according to claim 1, further comprising:

a motor coupled to the rotor torque assembly and configured to supply a torque to a rotor shaft of the rotor torque assembly to rotate the rotor blades about the rotor shaft;

a rotor control sensor configured to indicate rotor blade positions of the rotor blades as they rotate about the rotor shaft; and a motor control system coupled to the motor and the rotor control sensor and configured to control the torque supplied by the motor based, at least in part, on the rotor blade positions indicated by the rotor control sensor.

12. A method of operating a thrust-generating rotor assembly comprising:

receiving a control command to tilt a rotational plane of rotor blades for a rotor blade assembly towards a desired direction, wherein the rotor blade assembly is rotationally coupled to a rotor torque assembly for the thrust-generating rotor assembly and the rotor blades are configured to tilt about a rotor blade axis according to a blade pitch angle;

receiving rotor blade positions from a rotor control sensor configured to indicate the rotor blade positions of the rotor blades as they rotate about a rotor shaft of the rotor torque assembly; and controlling a motor coupled to the rotor torque assembly to supply a cyclic rapid torque increase or decrease to a rotor shaft of the rotor torque assembly to generate a corresponding cyclic increase or decrease of the blade pitch angle at a desired blade position configured to generate the tilt of the rotational plane of the rotor blades towards the desired direction, based, at least in part, on the received rotor blade positions, wherein the thrust-generating rotor assembly comprises a cyclic pitch control system comprising:

at least one spring member connected between the rotor torque assembly and the rotor blade assembly about its axis of rotation and configured to transfer changes in rotor torque into proportional changes in rotational offset between the rotor torque assembly and the rotor blade assembly without introducing tilting moments about the rotor blade axis, and a rotating damping member comprising a first concentric part and a second concentric part adapted to fit together with a damper between the two parts and interact with a pitch arm to transfer the changes in rotational offset into substantial tilting moments about the rotor blade axis at rapid changes in rotor torque and to cancel or limit the tilting moments at slow or permanent changes in rotor torque, wherein the tilting moments act on at least one rotor blade to control the blade pitch angle.

13. A method of assembling a thrust-generating rotor assembly comprising:

providing a rotor blade assembly comprising rotor blades configured to tilt about a rotor blade axis according to a blade pitch angle;

rotationally connecting a rotor torque assembly for the thrust-generating rotor assembly to the rotor blade assembly; and coupling a cyclic pitch control system to and/or between the rotor blade assembly and the rotor torque assembly, wherein the cyclic pitch control system comprises:

at least one spring member connected between the rotor torque assembly and the rotor blade assembly about its axis of rotation and configured to transfer changes in rotor torque into proportional changes in rotational offset between the rotor torque assembly and the rotor blade assembly without introducing tilting moments about the rotor blade axis, and a rotating damping member comprising a first concentric part and a second concentric part adapted to fit together with a damper between the two parts and interact with a pitch arm to transfer the changes in rotational offset into substantial tilting moments about the rotor blade axis at rapid changes in rotor torque and to cancel or limit the tilting moments at slow or permanent changes in rotor torque, wherein the tilting moments act on at least one rotor blade to control the blade pitch angle.

14. A method of assembling a thrust-generating rotor assembly according to claim 13, wherein the rotor blade assembly comprises dynamically stable rotor blades and/or a stabilizing flybar configured to create a stabilizing tilting moment about the rotor blade axis in response to an asymmetric blade pitch angle in the rotor blade assembly.

15. A method of assembling a thrust-generating rotor assembly according to claim 13, wherein the rotor torque assembly comprises a rotor shaft having a rotor shaft axis and a rotor head fixed to the rotor shaft, wherein the pitch arm comprises an upper end and a lower end.

16. A method of assembling a thrust-generating rotor assembly according to claim 13, wherein the rotor blade assembly comprises a connecting member configured to rotationally connect the rotor blade assembly to the rotor torque assembly and allow rotational movement between and/or limit planar movement of the rotor torque assembly and the rotor blade assembly.

17. A method of assembling a thrust-generating rotor assembly according to claim 13, wherein the rotor blade assembly comprises a first blade and a oppositely pointing second blade respectively being allowed to alter their blade pitch angle using pitch hinges mounted along the rotor blade axis, and wherein the pitch arm is connected to the first blade.

18. A method of assembling a thrust-generating rotor assembly according to claim 13, wherein the damping member and the damper are configured such that the two concentric parts generally follow each other's movements at rapid or cyclic changes in the speed and position of the first concentric part, and allow movements of the concentric parts to differ with respect to each other at a slow or permanent change in the speed and position of the first concentric part.

19. A method of assembling a thrust-generating rotor assembly according to claim 18, wherein:
- the damping member is mounted on a rotor head, positioned and centered around a rotor shaft of the rotor torque assembly;
- the concentric parts of the damping member are configured to rotate in a plane perpendicular to the rotor shaft axis;
- an upper end of the pitch arm is connected to the rotor blade assembly; and
- a lower end of the pitch arm is connected to the damping member by a hinged pitch arm connection.

20. A method of assembling a thrust-generating rotor assembly according to claim 18, wherein:
- the damping member is mounted on the rotor blade assembly;
- the concentric parts of the damping member are configured to rotate in a plane generally perpendicular to the rotor blade axis;
- the second concentric part is fixed to the rotor blade assembly;
- the first concentric part is connected to an upper end of the pitch arm; and
- a lower end of the pitch arm is connected to a rotor head of the rotor torque assembly by a hinged pitch arm connection.

* * * * *